Sept. 16, 1952 M. ROMANIUK 2,610,434
MECHANISM TO FACILITATE THE TURNING OF THE PAGES OF A BOOK
Filed March 17, 1950 3 Sheets-Sheet 1

INVENTOR.
MIRKO ROMANIUK
BY
*Stoodling and Krost attys.*

Sept. 16, 1952 M. ROMANIUK 2,610,434
MECHANISM TO FACILITATE THE TURNING OF THE PAGES OF A BOOK
Filed March 17, 1950 3 Sheets-Sheet 2
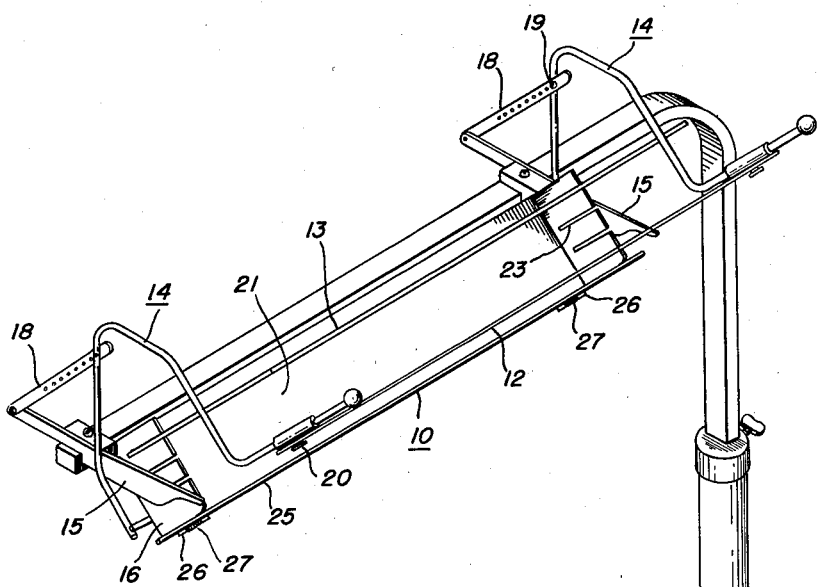
Fig. 3
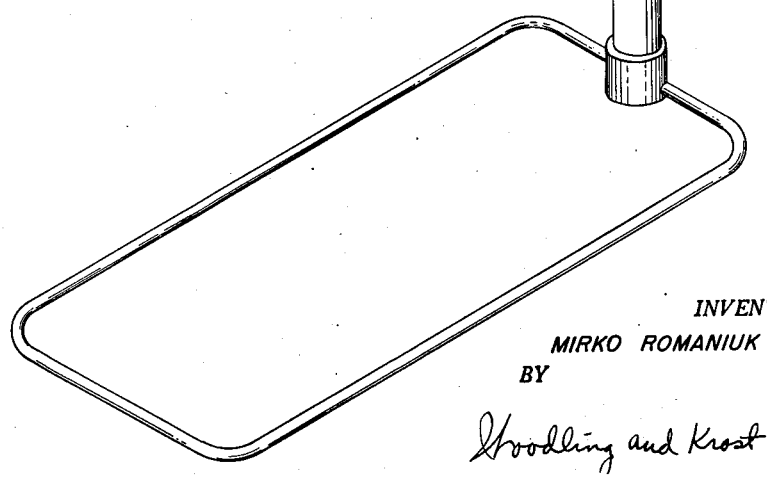
INVENTOR.
MIRKO ROMANIUK
BY
Stoodling and Krost attys.

Sept. 16, 1952    M. ROMANIUK    2,610,434
MECHANISM TO FACILITATE THE TURNING OF THE PAGES OF A BOOK
Filed March 17, 1950    3 Sheets-Sheet 3

INVENTOR.
MIRKO ROMANIUK
BY
Woodling and Krost attys.

Patented Sept. 16, 1952

2,610,434

UNITED STATES PATENT OFFICE 2,610,434

MECHANISM TO FACILITATE THE TURNING OF THE PAGES OF A BOOK

Mirko Romaniuk, Cleveland, Ohio

Application March 17, 1950, Serial No. 150,330

7 Claims. (Cl. 45—61)

This invention relates to a mechanism for facilitating the turning of the pages of a book.

An object of the invention is to provide for holding a book in a forwardly tilted position with the open pages of the book facing generally downwardly and defining a reading tilted angle with respect to the vertical whereby a person positioned beneath the book may read the book by looking generally upward toward the book.

Another object of the invention is to provide a book holder having means for facilitating the turning of the pages of a book.

Another object of the invention is the provision of two spaced surface means between which a book may be held in readable position, taken in combination with the mechanism for facilitating the separating of the two surface means whereby the top one of the turnable pages may be turned while said two spaced surface means are separated.

Another object of the invention is the provision of a mechanism for facilitating the turning of the pages of a book.

Another object of the invention is the provision of holding the open pages of a book in readable position for supporting the open pages of the book upon a surface holding means and of separating the book from the surface holding means for turning the pages therein after which the book is re-supported on the surface holding means.

Other objects and a fuller understanding of this invention may be had by referring to the following description and claims, taken in conjunction with the accompanying drawings in which:

Figure 3 is a perspective view of a book holder having mechanism for facilitating the turning of the pages of a book;

as shown in Figure 1;

Figure 1:
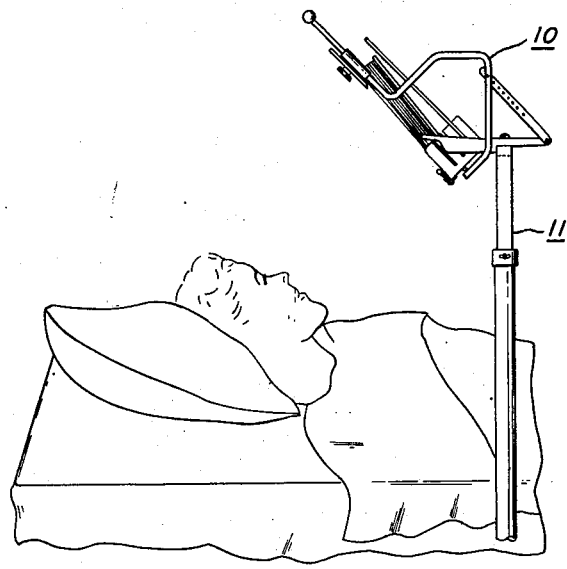
Figure 1 is a picture view of a book holding means holding a book in reading position for a person lying down.

The book holder illustrated and described herein comprises a book holder structure 10 mounted on a base 11. The book holder structure 10 has incorporated therein mechanism for facilitating the turning of the pages of the book, thus the book holding structure 10 has a page engageable surface means 12 and a book back engageable surface means 13. The page engageable surface means 12 in this instance is a cross member mounted on an angularly adjustable frame work 14. The page engageable surface means 12 is normally positioned at an angle relative to the vertical whereby a book held in the book holding structure 10 will lie against the page engageable surface means 12 with the open pages facing generally downwardly so that a person in an inclined position may look generally upwardly to read the pages.

The frame work 14 is constructed of a pair of spaced base members 15 adapted to be secured to the base 11 and end members 16 which are pivotally mounted on the base members 15 by screws 17 or any other suitable means. An adjustable member 18 pivotally mounted on the base member 15 at a distance from the screw 17 and adjustably fastenable to the end member 16 by bolts 19 provides for the angular adjustment of the end members 16 relative to their base members 15. It is understood that the structure on both ends of the book holding device is substantially the same and that generally equivalent parts are found on each end.

The page engageable surface 12, which, in the present disclosure, is in the form of a member designated by the same character 12, extends between the end members 16 and is positioned at a distance from the screws 17 which locate the pivotal mounting of the end member 16 on the base members 15. There is provided a clamping means such as bolts and nuts 20 for tightening the page engageable surface member 12 to the end members 16 at the desired position. After the adjustment member 18 and the nuts 20 have been properly adjusted so that a book held in the holding device will lie under its own weight against the page engageable surface 12, these adjustments remain fixed until another book of different size is to be positioned in the book holding structure.

Pivotally mounted on the end members 16 and extending therebetween is a book shelf 21 having the ends 22 thereof bent upwardly and provided with slots 23. This shelf 21 is pivotally mounted between the end members 16 at substantially right angles to the plane of the pages engageable surface 12. In this particular instance, the book shelf 21 is pivotally mounted by the mountings 17 which pivotally or adjustably mount the ends 16 on the base members 15.

The slots 23 in the upturned ends 22 of the shelf, however, are positioned in planes substantially parallel to the page engageable surface 12 and are adapted to receive the book back engageable surface member 13, which bears the same number as the back engageable surface 13. It is noted that slots 23 are provided in each end 22 of the shelf, whereby the back engageable surface 13 may be positioned in parallel planes at various distances from the page engageable surface means 12. When a thick book is inserted in the book holding structure 10, the back engageable surface 13 is positioned in slots 23 at a distance further from the page engageable surface 12 than when a thin book is inserted in the book holding structure.

Figure 2:
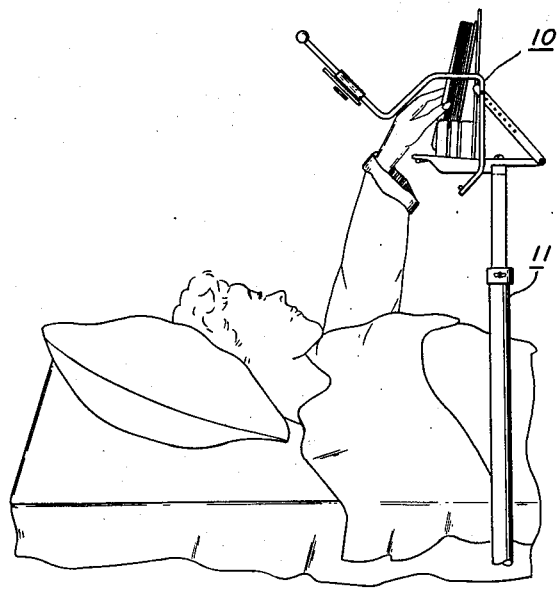
Figure 2 illustrates a person turning a page in the book after which time the book will be returned to the position of Figure 1.
Figure 4:
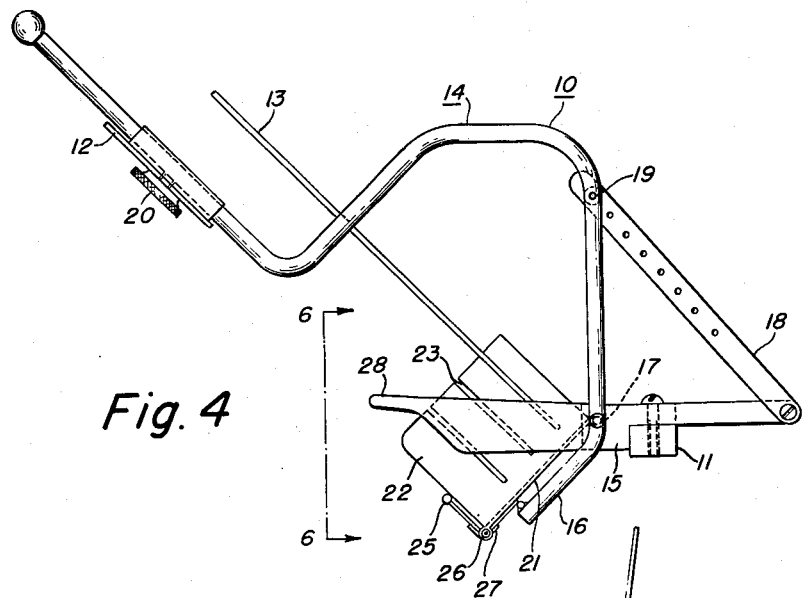
Figure 4 is an end view illustrating the book holder in reading position.
Figure 5:
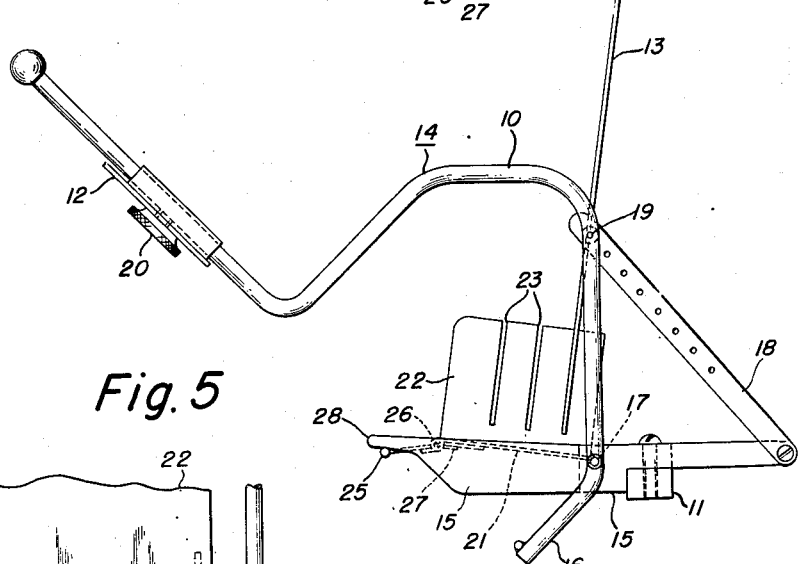
Figure 5 is an end view with the book holder surfaces separated whereby a page may be turned in the book.
Figure 6:
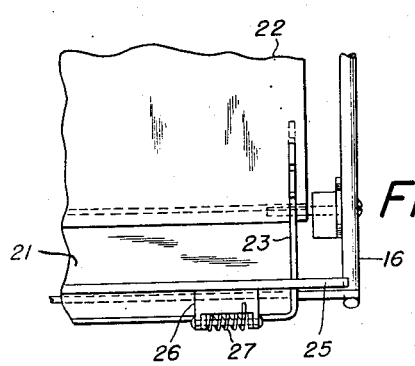
Figure 6 is a fragmentary enlarged front view showing the pivotal mounting of the surface means on one end thereof.

In Figure 4 of the drawings, the back engageable surface member 13 is positioned in the slots 23 for a thick book. In this view the book holding structure is in reading position whereby a book being held therein could be read by a person looking generally upwardly as in Figure 1. In Figures 2 and 5, of the drawings, the shelf 21 has been pivoted or angularly moved whereby the back engageable surface member 13 has passed through a vertical plane and is at a slight angle to the vertical plane. In this position the surfaces 12 and 13 have been separated whereby the page in the book may be turned by hand as illustrated in Figure 2.

It has been found advisable to hingedly mount a rod 25 along the forward edge of the shelf 21. This rod 25 is disposed at a distance above the shelf 21 and in the plane of the page engageable surface 12 so that it can engage the pages of the book along the bottom thereof. Hinges 26 hingedly support the rod 25 on the shelf 21. These hinges 26 may be of the spring hinge type having springs 27 whereby the rod 25 is normally held against the ends 22 of the shelf 21 in the plane of the page engagement surface 12. While the book is lying with the pages against the page engageable surface 12, the springs 27 urge the rod 25 towards the back engageable surface 13 and thus press it against the pages of the book.

When the page in the book is to be turned, the book is moved away from the page engageable surface 12. At the same time, the rod 25 is hingedly moved relative to the shelf and against the urging of the springs 27 away from the pages of the book. The rod 25 has a length greater than the length of the shelf 21 and greater than the spacing between the base members 15 of the book holding structure 10. The base members 15 are also provided with extension portions 28 which are engageable by these ends of the rod 25. As the shelf 21 moves between the base members 15, the extended ends of the rod 25 engage the extension portions 28 of the base member 15 to hingedly move the rod 15 relative to the shelf 21. This movement of the rod 25 against the urging of the springs 27 is best illustrated in Figures 4 and 5 and especially in Figure 5 where the ends of the rod 25 are abutting the extension portions 28 of the base members 15.

In operating the book holding structure and especially the mechanism for facilitating the turning of the pages of a book, a book is placed in the book holding structure 10 with the open pages thereof lying against the page engagement surface 12 and the rod 25. The lower edge of the book rests on the shelf 21. Next the back engagement surface member 13 is placed in correct slots 23 in the upturned ends of the shelf 22. In this position the book is facing generally downwardly and at an inclined angle other than vertical. When a page in the book is to be turned, the person reading the book simply pushes against the page in an upward direction, thus angularly moving the book from the position of Figure 1 to the position illustrated in Figure 2. The rod 25 during this movement of the book has been moved away from the page by means of the ends of the rod engaging the extension portions 28 of the base members 15, as illustrated in Figure 5. When the book is angularly moved to the position as illustrated in Figure 5, the page engageable surface means and the back engageable surface means have been separated. After the page in the book has been turned, the reader or person may simply release the book. The spring 27 in urging the rod 25 towards the back engageable surface 13, and thus against the extension portion 28, will move the shelf and the book to the readable position, as illustrated in Figures 1 and 4. It is understood, however, that the person reading the book may hold his hand against the open pages of the book to return the book forward slowly against the page engageable surface 12.

When the book is in open readable position, it is positioned between the surfaces 12 and 13 with the back cover of the open book next adjacent the back engageable surface 13 and the open pages of the book next adjacent the page engageable surface 12. Upon movement of the surface means 12 and 13 apart or to the separated positions with the back cover of the book retained against the back engageable surface 13, there is provided clearance space relative to the page engageable surface 12 for the top one of the turnable pages of the book to be turned.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Mechanism for facilitating the turning of the pages of a book, comprising, a frame, book-holding means having first means and second means, said second means being fixedly carried by said frame at an acute angle to the vertical, said first means being hinged relative to said second means so that an open book may be placed in a readable position with the back cover of the open book positionable next adjacent the first means and with the open pages of the book positionable next adjacent the second means in a downwardly tilting position, said first means being hingedly separable from said second means thereby providing clearance space relative to the second means for the exposed one of the turnable pages of the book to be turned.

2. Mechanism for facilitating the turning of the pages of a book, comprising, a frame, book-holding means carried by said frame and having first surface means and second surface means between which an open book may be placed in a readable position, said first surface means facing downwardly and said second surface means facing upwardly, the back cover of the open book positionable next adjacent and below the first surface means and with the open pages of the book resting on the second surface means, and said first surface means being hingedly separable from said second surface means thereby providing clearance space relative to the second surface means for the exposed turnable pages of the book to be turned, said second surface means having spaced surfaces with an open area therebetween whereby the exposed pages of the book may be read looking upwardly through said open area.

3. Mechanism for facilitating the turning of the pages of a book, comprising, a frame, book-holding means having first means and second means, said second means being adjustably securable to said frame at an acute angle to the vertical and with a page engaging surface on the upper side thereof, said first and second means being spaced apart to receive an open book in a readable position with the back cover of the open book positionable next adjacent and below the first means and with the open pages of the book resting on the upwardly facing page engaging surface of the second means, and said first means being movable upwardly from said second means, thereby providing clearance space relative to the second means for the exposed pages of the book to be turned.

4. Mechanism to facilitate the turning of the pages of a book, comprising, a base member, a front member having page engaging surface means and adjustably carried by said base member, said front member being adjustable to a plane at an acute angle to the vertical with the surface means on the upper side thereof, book-holding means pivotally mounted to said base member and including a bottom shelf and book cover engaging means, said book-holding means being pivotable through an acute angle from a reading position to a page turning position, said reading position establishing said book cover engaging means substantially parallel to and spaced from the plane of said front member, and said page turning position establishing said book cover engaging means at an acute angle to the plane of said front member.

5. Mechanism to facilitate the turning of the pages of a book, comprising, a base member, two laterally spaced adjustable frame members, a front member having page engaging surface means and adjustably carried by said two frame members, said frame members being adjustable to dispose said front member in a plane at an acute angle to the vertical with the surface means on the upper side thereof, book-holding means pivotally mounted between said two frame members and including a bottom shelf and book cover engaging means substantially mutually perpendicular, said book-holding means being pivotable through an acute angle from a reading position to a page turning position, said reading position establishing said book cover engaging means substantially parallel to and spaced from the plane of said front member, said page turning position establishing said book cover engaging means at an acute angle to and on the opposite side of vertical from the plane of said front member, and spring means pivotally urging said book cover engaging means from said page turning position to said reading position.

6. Mechanism to facilitate the turning of the pages of a book, comprising, a base member, two laterally spaced adjustable frame members, a front member having page engaging surface means and adjustably carried by said two frame members, said frame members being adjustable to dispose said front member in one of a number of planes at an acute angle to the vertical with the surface means on the upper side thereof, book-holding means pivotally mounted between said two frame members and including a bottom shelf and book cover engaging means substantially mutually perpendicular, said book-holding means being pivotable through an acute angle from a reading position to a page turning position, said reading position establishing said book cover engaging means substantially parallel to and spaced from the plane of said front member, said page turning position establishing said book cover engaging means at an acute angle to and on the opposite side of vertical from the plane of said front member, a window in said front member to permit viewing the open pages of a book in said book-holding means, a rod pivotally carried by said bottom shelf, cam means carried by said two frame members engageable by said rod when said book-holding means is in said page turning position to separate said rod and said book cover engaging means, and spring means pivotally urging said rod toward said book cover engaging means, said page turning position stressing said spring means so that said book-holding means is urged toward said reading position.

7. Mechanism to facilitate the turning of the pages of a book, comprising, a base member, two laterally spaced adjustable frame members, a front member having page engaging surface means and adjustably carried by said two frame members, said frame members being adjustable to dispose said front member in one of a number of planes at an acute angle to the vertical with the surface means on the upper side thereof, book-holding means pivotally mounted between said two frame members and including a bottom shelf and book cover engaging means substantially mutually perpendicular, said book-holding means being pivotable through an acute angle from a reading position to a page turning position, said reading position establishing said hook cover engaging means substantially parallel to and spaced from the plane of said front member, said page turning position establishing said book cover engaging means at an acute angle to and on the opposite side of vertical from the plane of said front member, a window in said front member to permit viewing the open pages of a book in said book-holding means, a rod pivotally carried by said bottom shelf, cam means carried by said two frame members engageable by said rod and cooperating therewith to separate said rod and said book cover engaging means when said book holding means is in said page turning position.

MIRKO ROMANIUK.

REFERENCES CITED

The following references are of record in the file of this patent:

UNITED STATES PATENTS

| Number | Name | Date |
| --- | --- | --- |
| 550,289 | Platt | Nov. 26, 1895 |
| 1,849,990 | Otsuki | Mar. 15, 1932 |
| 2,302,806 | Senter | Nov. 24, 1942 |
| 2,386,576 | Solberg | Oct. 9, 1945 |

FOREIGN PATENTS

| Number | Country | Date |
| --- | --- | --- |
| 11,836 | Great Britain | 1892 |